United States Patent
Betin et al.

(10) Patent No.: US 7,193,772 B2
(45) Date of Patent: Mar. 20, 2007

(54) CONDUCTIVELY COOLED LIQUID THERMAL NONLINEARITY CELL FOR PHASE CONJUGATION AND METHOD

(75) Inventors: Alexander A. Betin, Manhattan Beach, CA (US); N. Peter Davis, Redondo Beach, CA (US); Joseph J. Ichkhan, Redondo Beach, CA (US)

(73) Assignee: Raytheon Company, Waltham, MA (US)

( * ) Notice: Subject to any disclaimer, the term of this patent is extended or adjusted under 35 U.S.C. 154(b) by 274 days.

(21) Appl. No.: 10/866,201

(22) Filed: Jun. 10, 2004

(65) Prior Publication Data

US 2005/0275935 A1    Dec. 15, 2005

(51) Int. Cl.
*H01S 3/00* (2006.01)
*G02B 26/08* (2006.01)

(52) U.S. Cl. .................. 359/349; 359/300; 359/338; 359/347

(58) Field of Classification Search ................ 359/300, 359/338, 349, 347
See application file for complete search history.

(56) References Cited

U.S. PATENT DOCUMENTS 4,175,835 A * 11/1979 Kuhn, Jr. .................... 359/845
4,253,739 A *  3/1981 Carlson ...................... 359/845

(Continued)

OTHER PUBLICATIONS

A.A. Betin, "Phase Conjugation Based On Thermal Nonlinearity," presented at Nonlinear Optics Materials, Fundamentals, and Applications Conference, Maui, Hawaii, Jul. 1996.

A.A. Betin, S.C. Matthews, and M.S. Mangir, "Phase Conjugation of Depolarized Light with a Loop PC", Nonlinear Optics: Materials, Fundamentals, and Applications Conference, Kauai, Hawaii, Jul. 1998.

(Continued)

*Primary Examiner*—Jack Keith
*Assistant Examiner*—Eric Bolda
(74) *Attorney, Agent, or Firm*—Leonard A. Alkov; Karl A. Vick

(57) ABSTRACT

A thermal nonlinear cell and method. The cell includes a substantially planar nonlinear medium and a mechanism for removing thermal energy from the medium in a direction substantially orthogonal to said medium. In one embodiment, the mechanism for removing thermal energy is a thermally conductive window mounted adjacent to the medium. Preferably, the mechanism includes plural thermally conductive windows between which the nonlinear medium is disposed. In the best mode, the windows are sapphire and the nonlinear medium is a fluid. The windows and the medium are transmissive with respect to first and second beams that interfere with each other and create an interference pattern in the cell. The interference pattern is sampled by a sampling hologram created within the multiple layers of the medium. The interference pattern is used via a sampling hologram to create a phase conjugate of a signal beam. The windows move thermal energy from the medium in a direction transverse to the longitudinal axis of the medium. This energy is then removed by heat sinks disposed at the ends of the stack of windows. In an alternative embodiment, the mechanism for removing thermal energy includes first and second mirrors mounted adjacent to the medium in a substantially parallel face-to-face relation. Preferably, the mirrors are heat exchangers such as slot-jet impingement coolers. In this embodiment, a transparent window is disposed between the mirrors and the nonlinear medium is disposed between the mirrors and the window. The mirrors are adapted to reflect first and second beams into the medium where they interfere to provide the interference pattern needed to create a phase conjugate beam.

8 Claims, 2 Drawing Sheets

U.S. PATENT DOCUMENTS

| | | | |
|---|---|---|---|
| 4,408,833 A * | 10/1983 | Gowan | 359/845 |
| 4,762,397 A * | 8/1988 | Pepper | 349/17 |
| 4,877,312 A * | 10/1989 | Huignard et al. | 359/243 |
| 5,365,538 A * | 11/1994 | Tumminelli et al. | 372/66 |
| 5,726,795 A | 3/1998 | Betin | |
| 6,288,833 B1 * | 9/2001 | Kasamatsu | 359/333 |
| 6,339,605 B1 | 1/2002 | Vetroveck | |
| 6,347,109 B1 | 2/2002 | Beach et al. | |
| 6,778,319 B2 * | 8/2004 | Chavez-Pirson et al. | 359/333 |
| 2002/0021486 A1 * | 2/2002 | Lange et al. | 359/333 |

OTHER PUBLICATIONS

O.L. Antipov, A.A. Betin, E.A. Zhukov and S.G. Turgenev, "Four-wave Interaction of Middle-Infrared Radiation in Media with a Thermal Nonlinearity," Sov. J. of Quantum Electronics, 19, Nov. 1989, p. 1465.

A.A. Betin and A.V. Kirsanov, "Selection of a Phase-Conjugate Wave in an Oscillator Based on a Four-Wave Interaction with Feedback in an Extended Nonlinear Medium," Quantum Electronics, 24, 1994, p. 219.

K. Ergakov and V. Yarovoy, "Investigation of Energy and Adaptive Capabilities of Four-Wave Mixing Scheme with a Feedback (FWMF) on YAG:Nd-active Medium in Single and Repetitive Pulse Generation Regimes," in Phase Conjugation and Adaptive Optics, SPIE Proceedings, vol. 2771, 1996, p. 75.

O.L. Antipov et al: "Four-Wave Interaction of Middle-Infrared Radiation in Media with a Thermal Nonlinearity" Sov. J. Quantum Electron., vol. 19, No. 11, Nov. 1989, pp. 1465-1473, XP009055036
* p. 1471, col. 2, line 26—p. 1472, col. 1, line 29; Fig. 4.

* cited by examiner

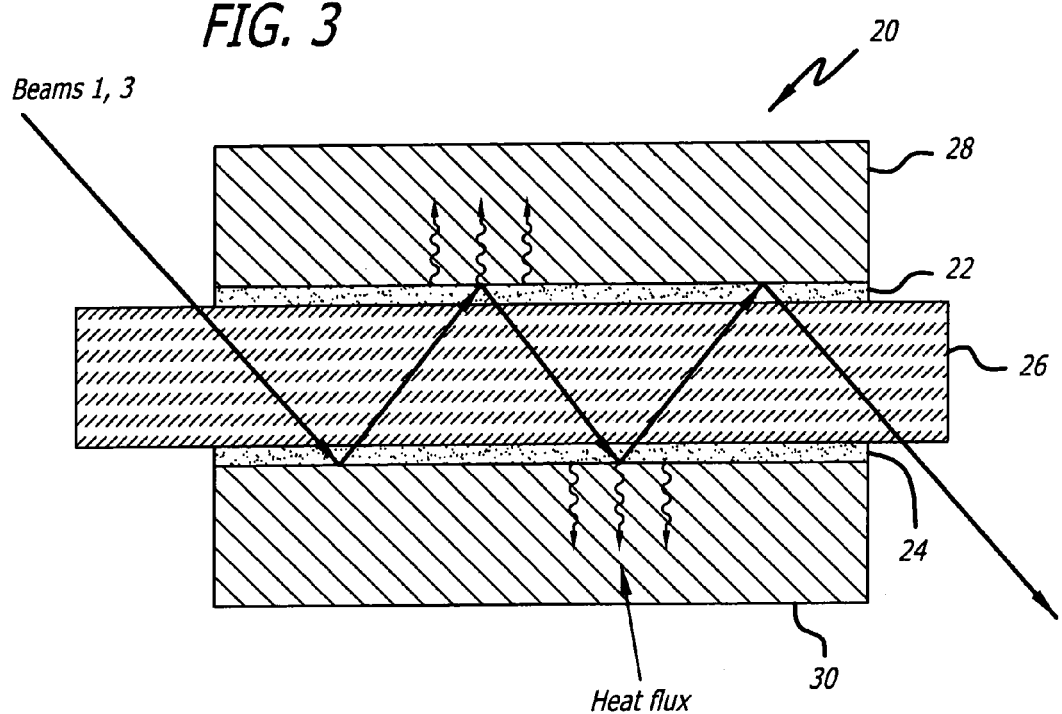
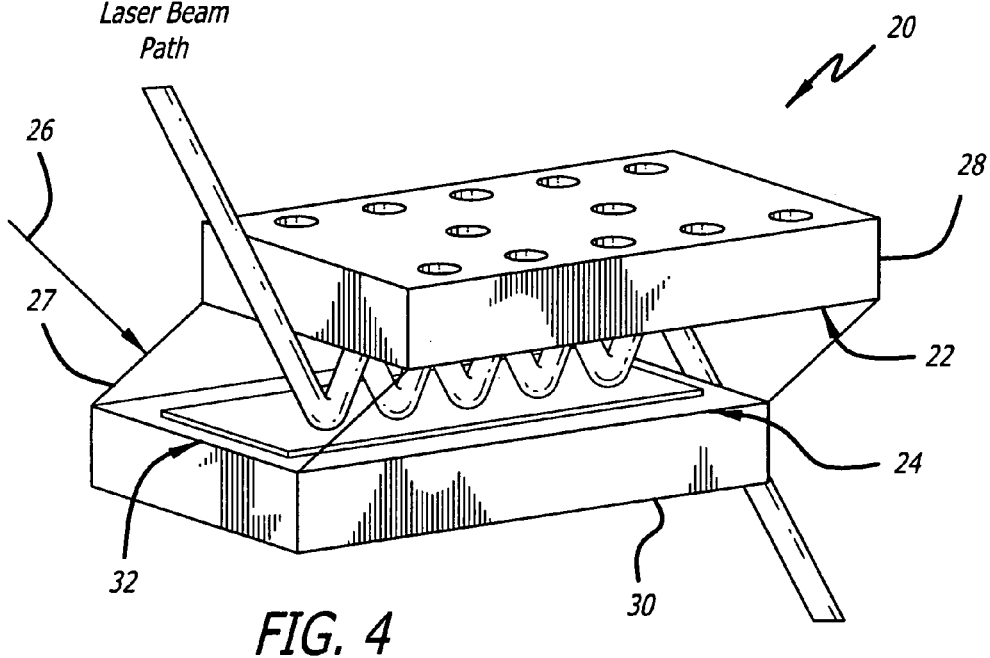

CONDUCTIVELY COOLED LIQUID THERMAL NONLINEARITY CELL FOR PHASE CONJUGATION AND METHOD

BACKGROUND OF THE INVENTION

1. Field of the Invention

The present invention relates to lasers. More specifically, the present invention relates to high energy lasers.

2. Description of the Related Art

Four-wave mixing is a typical process for realizing a phase conjugation effect. See U.S. Pat. No. 5,726,795; issued Oct. 30, 1996 to A. A. Betin, M. S. Mangir, and D. A. Rockwell, entitled COMPACT PHASE-CONJUGATE MIRROR UTILIZING FOUR-WAVE MIXING IN A LOOP CONFIGURATION, the teachings of which are hereby incorporated herein by reference. Four-wave mixing involves the use of two counter propagating pump beams and a nonlinear medium. The beams propagate through the medium along with a signal beam of which a phase conjugate beam is to be generated. The signal beam propagates through the medium at an angle relative to at least one of the pump beams and thereby creates an interference pattern. The remaining pump beam reads the interference pattern as a hologram producing a phase conjugate return of the signal beam.

While any nonlinear medium may be used, for certain applications such as infrared lasers, e.g., $CO_2$ lasers operating at 10.2 microns, fewer options are available. For these applications, thermal nonlinearities are currently typically used. Thermal nonlinearities are created by applying heat to conventional nonlinear media to create a temperature gradient that effects a change in the refractive index of the medium. The heat is generated by natural or controlled absorption of laser beam power while propagating through a nonlinear medium. The change in the refractive index leads to the creation of a hologram and thus a phase conjugate beam may be created.

Initially, long mediums were used to control undesirable temperature increases. However, this approach gave way to the use of a thin layer of liquid for nonlinear mediums for four-wave mixing.

Unfortunately, the efficacy of four-wave mixing for phase conjugation has been complicated by the need for high quality pump beams. The pump beam power is typically 100 times that of the signal beams. Accordingly, these beams must be properly conditioned to provide high quality diffraction limited (planar wave) beams. Thus, in order to compensate for distortions in the amplifier beamline, a phase conjugate of the signal beam must be generated. However, in order to generate a phase conjugate of the signal beam, the pump beams must be conditioned. Hence, this has limited the practical application of the four-wave mixing for optical phase conjugation.

Consequently, a loop type conjugator approach has been widely used because, although it uses a four-wave mixing process, it does not require high quality pump beams. As is well known in the art, in a typical loop phase conjugate mirror (LPCM) system, a beam is launched in a nonlinear medium, traverses a loop and re-enters the medium. With an amplifier in the loop, the loop will resonate due to spontaneous noise and generates a conjugated return beam. Hence, any type of nonlinearity may be used and it may be scaled for high power applications.

However, the cell, in which the nonlinear medium is disposed, in a loop PCM must be activated at high average power. Inasmuch as a thermal nonlinearity effect is being used, the cell will absorb thermal energy. Hence, heat must be rejected while the cell is being used to write and read holograms created therein. As a single thin layer nonlinear medium is insufficient to provide adequate heat rejection and angular selectivity, multiple layers are used to provide a volume hologram effect. Volume holograms are inherently selective of the conjugated beam relative to a noise component.

In one prior approach, a loop PCM is used with a thin layer nonlinear medium in which a liquid is induced to flow in the medium to optimize heat rejection. While viable, this approach was problematic for many current applications. For example, the hologram may be washed out if the liquid is moved too quickly. Further, the system is mechanical and, as such, costly to construct and operate. Hence, multiple layer holograms have not heretofore been found to be as effective as volume holograms in loop PCM applications.

Thus, a need remains in the art for an improved system or method for removing thermal energy from a liquid nonlinearity cell while retaining the phase conjugating properties thereof, including reflectivity and selectivity of a hologram created therein, which is scalable for high power applications.

SUMMARY OF THE INVENTION

The need in the art is addressed by the thermal nonlinear cell and method of the present invention. In general, the inventive cell includes a substantially planar nonlinear medium and a mechanism for removing thermal energy from the medium in a direction substantially orthogonal to said medium.

In one embodiment, the mechanism for removing thermal energy is a thermally conductive window mounted adjacent to the medium. Preferably, the mechanism includes plural thermally conductive windows between which the nonlinear medium is disposed. In the best mode, the windows are sapphire and the nonlinear medium is a fluid. The windows and the medium are transmissive with respect to first and second beams that interfere with each other and create an interference pattern in the cell. The interference pattern is sampled by a sampling hologram created within the multiple layers of the medium. The interference pattern is used via a sampling hologram to create a phase conjugate of a signal beam. The windows move thermal energy from the medium in a direction transverse to the longitudinal axis of the medium. This energy is then removed by heat sinks disposed at the ends/edges of the stack of windows.

In an alternative embodiment, the mechanism for removing thermal energy includes first and second mirrors mounted adjacent to the medium in a substantially parallel face-to-face relation. Preferably, the mirrors are heat exchangers such as slot-jet impingement coolers. In this embodiment, a transparent window is disposed between the mirrors and the nonlinear medium is disposed between the mirrors and the window. The mirrors are adapted to reflect first and second beams into the medium where they interfere to provide the interference pattern needed to create a phase conjugate beam.

BRIEF DESCRIPTION OF THE DRAWINGS

FIG. 3 is a sectional side view of a conductively cooled reflective thermal cell implemented in accordance with an alternative embodiment of the present teachings.

FIG. 4 is a 3-D solid model of a preferred embodiment of the inventive reflective thermal nonlinearity cell showing its internal optical components.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
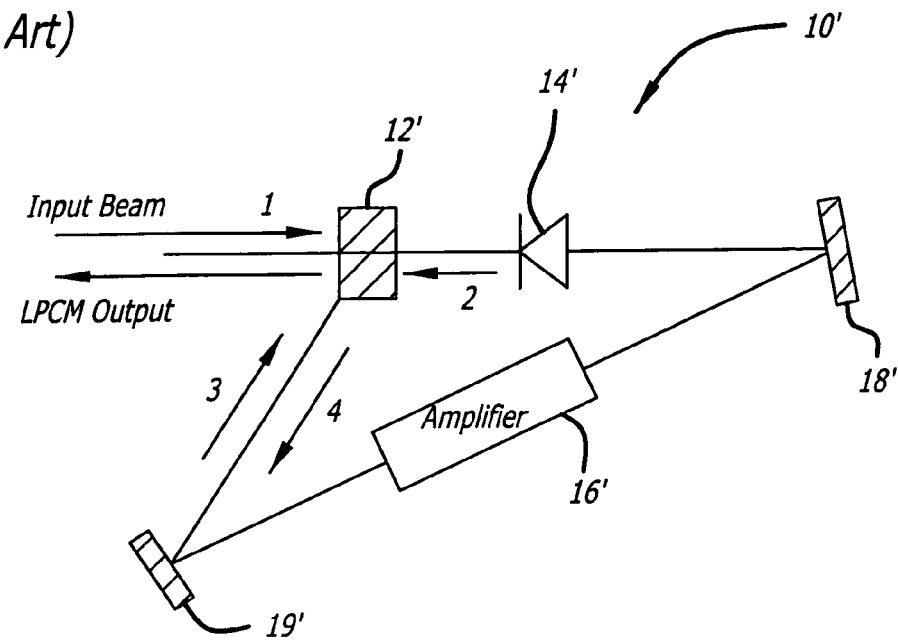
FIG. 1 is an optical schematic of a loop phase conjugate mirror (LPCM) scheme that uses a liquid thermal nonlinearity cell in a four-wave mixing (FWM) configuration to create a holographic mirror in accordance with conventional teachings.

FIG. 1 is an optical schematic of a loop phase conjugate mirror (LPCM) scheme that uses a liquid thermal nonlinearity cell in a four-wave mixing (FWM) configuration to create a holographic mirror in accordance with conventional teachings. The system 10' includes a cell 12' containing a liquid nonlinear medium, a Faraday isolator 14', an amplifier 16' and first and second mirrors 18' and 19', respectively.

In operation, an input beam 1 enters the cell 12' from the left and traverses the loop in a clockwise direction, where it becomes beam 3. The Faraday isolator 14' attenuates the beam sufficiently to prevent saturation of the amplifier 16' and provide a beam 3 of comparable intensity to incident beam 1. Beams 1 and 3 then interfere within the nonlinear medium 12' creating fringes of high and low intensity in an optical interference pattern. The thermal nonlinearity of the medium reproduces the optical fringe pattern as a pattern of high and low refractive index, effectively creating a real-time hologram of the optical interference pattern. This hologram serves as a resonator mirror allowing a beam to grow from noise in a counterclockwise direction around the loop formed by the hologram and the two fixed mirrors. The condition for oscillation is met when the gain of the amplifier 16' exceeds the losses in the loop. Beam 2 is the laser beam that builds in this manner which, when diffracted by the hologram becomes beam 4. The un-diffracted portion of beam 2 is transmitted through the nonlinear medium and becomes the output beam.

For this resonator configuration, the lowest order mode is that for which beam 2 is the phase conjugate of beam 1. By optical reciprocity, beam 4 is also the phase conjugate of beam 3. Under the right mode selection conditions, the phase conjugate mode is the dominant mode within the resonator.

The use of a thermal nonlinearity in a thin layer of absorbing liquid for four-wave mixing phase conjugation of pulsed and (that was most important) of CW and QCW laser radiation was demonstrated by O. L. Antipov, A. A. Betin, E. A. Zhukov and S. G. Turgenev, in "Four-wave Interaction of Middle-Infrared Radiation in Media with a Thermal Nonlinearity," published in Sov. J. of Quantum Electronics, p. 1465 (Nov. 19, 1989). A thin layer of an organic solvent was placed between two transparent windows or between a transparent window and a high reflective mirror forming a thermal nonlinearity cell for FWM interaction and phase conjugation. In a latter case the mirror was cooled providing a capability to realize FWM process in CW and QCW regimes. However, this approach was not seen by most to be directly applicable for the LPCM scheme for two reasons. One reason is that the LPCM with a one thin layer thermal cell may not provide adequate phase conjugation fidelity, due to insufficient selectivity of a conjugated wave by a thin hologram. Another reason is that one layer hologram is not well projected to high power scaling of the LPCM, because its capability in sustaining high laser power and thermal load just in one layer of absorbing liquid could be limited.

Another approach was to force the liquid to flow in the layer between two transparent windows and remove the generated heat by moving heated liquid from the laser interaction region, see "Investigation of Energy and Adaptive Capabilities of Four-Wave Mixing Scheme with a Feedback (FWMF) on YAG:Nd-active Medium in Single and Repetitive Pulse Generation Regimes," published by K. Ergakov and V. Yarovoy, in *Phase Conjugation and Adaptive Optics*, SPIE Proceedings, vol. 2771, p.75 (1996). However, this straight-forward and viable technique would require mechanical means to provide the liquid flow, such as pumps, etc., and a careful consideration of the suitable flow velocity by adjusting it to the parameters of the recorded hologram and a capability to remove the heat, but not to destroy a positive effect of heating that results in the hologram recording and without washing the hologram out by the flow of liquid. For high average power operation the flow velocity and the pressure drop could be too high to be able to project the anticipated LPCM power scalability. Again, one thin layer forming a hologram has not been found to be sufficient to provide adequate phase conjugation fidelity.

There is a currently a need for a novel thermal nonlinearity cell design with power and fidelity scalability in order to support high power solid state laser development, specifically for laser system architectures based on phase conjugate master oscillator power amplifier (PCMOPA) schematics, where the LPCM may play a role of a phase conjugate mirror and thus serves as an output beam quality maintaining element.

Conductively Cooled Transmission Thermal Cell

Figure 2:
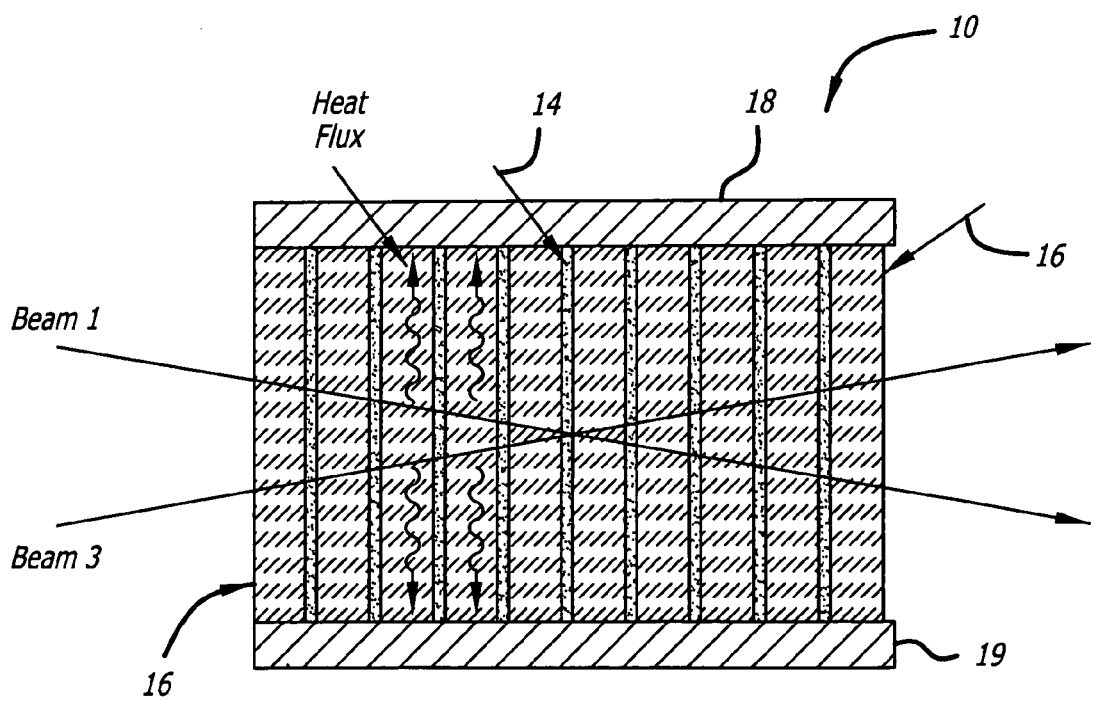
FIG. 2 is a sectional side view of a conductively cooled thermal cell implemented in accordance with an illustrative embodiment of the teachings of the present invention.

FIG. 2 is a sectional side view of a conductively cooled thermal cell implemented in accordance with an illustrative embodiment of the teachings of the present invention. This is a transmission cell configuration. In this embodiment, the inventive liquid nonlinear cell 10 is configured as a series of thin layers of nonlinear media 14 in a fluid state that are sandwiched between relatively thick circular or rectangular (or other shapes) disks or windows 16 of highly thermally conductive materials, such as sapphire (preferred), magnesium oxide MgO, magnesium flouride $MgF_2$, diamond, etc. As is common in the art, the nonlinear medium may be acetone or any other suitable nonlinear optical medium.

In the illustrative embodiment, the windows 16 are cooled at their cylindrical edges, via conduction to a metal heatsink 18, which in term is cooled by water or air. However, those of ordinary skill in the art will appreciate that the invention is not limited to the cooling arrangement shown. Other cooling arrangments may be used without departing from the scope of the present teachings. Further, the invention is not limited to the illustrative materials used for the nonlinear medium or the windows.

The liquid layers create a sampling hologram such that the optical interference pattern, formed by beams 1 and 3, is sampled at discrete points along volumetric region over which beams 1 and 3 interact, as it is imprinted in the temperature grating in each layer. The distance between sampling points is set by the center-to-center spacing (or pitch) of the sapphire disks. For most effective sampling performance (or when multi-layer hologram selectivity approaches to the real volume hologram selectivity), the pitch is about equal or smaller than the longitudinal correlation length of the recorded hologram. The generated heat in a layer conducts first longitudinally to the adjacent windows and then radially through windows to a peripheral heatsink.

The transmission thermal cell should be relatively easy to implement, especially for low and moderate (up to about a kilowatt) power levels. The performance of the transmission thermal nonlinearity cell can be optimized by varying multiple parameters, namely: properties of liquid, window and other parts/materials used in the cell construction; layer thickness and its absorption; number of layers; window thickness and diameter; geometry of laser beams interaction region, such as beams diameters and divergences and a convergent angle; etc. The optimization criteria are the required operational power and phase conjugation fidelity. Generally, thermal nonlinearity power handling capability scales up proportionally to the overall length of the cell.

Conductively Cooled Reflective Thermal Cell

FIG. 3 is a sectional side view of a conductively cooled reflective thermal cell implemented in accordance with an alternative embodiment of the present teachings. FIG. 3 shows an optical schematic of the reflective thermal cell, with two layers of liquid 22 and 24 separated by a thick, optically-transparent window 26 and cooled through mirrored surfaces disposed on integral heat exchangers 28 and 30. The window 26 may be fused silica or other suitable material. In this arrangement the nonlinear liquid medium 22 is disposed adjacent to a cooled mirror surface such that the heat flow becomes one dimensional, essentially in the same longitudinal axis of the laser beams 1 and 3. Because the heat path from the liquid layer to the coolant inside the mirror could be short, the maximum temperature difference across that path could be very small, not more than several degrees centigrade. By contrast, the maximum temperature difference across the radial conduction heat path in the sapphire windows of the transmission thermal cell could be as high as 20 to 30° C. Generally, the power handling capability of the reflective thermal nonlinearity cell scales up proportionally to the area of the interacting laser beams inside the cell.

This configuration offers the potential of higher power scalability than a transmission type cell. This advanced scalability is due to the cell geometry and ability to avoid a lateral heat path and placing a liquid layer closer to the heatsink.

FIG. 4 is a 3-D solid model of a preferred embodiment of the inventive reflective thermal nonlinearity cell showing its internal optical components. In the best mode, the heat exchanger 28 and 30 are slot-jet impingement coolers manufactured by MC2, Inc., the cooling faces of which have a mirror surface. The nonlinear liquid and the rest of the assembly is sealed by o-rings 32 disposed in grooves (not shown) machined into the cooler surfaces. The o-rings 32 are pressed against the faces of transparent window trapping the liquid therebetween.

Thus, the present invention has been described herein with reference to a particular embodiment for a particular application. Those having ordinary skill in the art and access to the present teachings will recognize additional modifications applications and embodiments within the scope thereof. For example, multiple diverse designs and implementations optimized for different situations and applications may be employed without departing from the scope of the present teachings.

It is therefore intended by the appended claims to cover any and all such applications, modifications and embodiments within the scope of the present invention.

Accordingly,

What is claimed is:

1. A thermal nonlinear cell comprising:
   a first mirror;
   a second mirror disposed in a substantially parallel face-to-face orientation relative to said first mirror;
   a transparent window disposed between said first and second mirrors; and a nonlinear medium disposed between said mirrors and said window, wherein at least one of said mirrors is a heat exchanger.

2. The invention of claim 1 wherein both of said mirrors are heat exchangers.

3. The invention of claim 1 wherein said medium is a fluid.

4. The invention of claim 1 further including a seal adapted to secure said medium between said windows and said mirrors.

5. The invention of claim 1 wherein said heat exchanger is a slot-jet impingement cooler.

6. The invention of claim 1 wherein said mirrors are adapted to reflect first and second beams into said medium.

7. The invention of claim 6 wherein said beams interfere with each other and thereby create an interference pattern in said cell.

8. The invention of claim 7 wherein said interference pattern is sampled by said nonlinear medium.

* * * * *